US012402235B2

(12) United States Patent
Shin et al.

(10) Patent No.: US 12,402,235 B2
(45) Date of Patent: Aug. 26, 2025

(54) PLASMA GENERATION DEVICE

(71) Applicant: Korea Institute of Fusion Energy, Daejeon (KR)

(72) Inventors: Dong Hun Shin, Jeollabuk-do (KR); Yong Cheol Hong, Gyeonggi-do (KR); Se Min Chun, Jeollabuk-do (KR); Geon Woo Yang, Jeollabuk-do (KR); Hee Jae Lee, Jeollabuk-do (KR)

(73) Assignee: Korea Institute of Fusion Energy, Daejeon (KR)

( * ) Notice: Subject to any disclaimer, the term of this patent is extended or adjusted under 35 U.S.C. 154(b) by 284 days.

(21) Appl. No.: 18/020,059

(22) PCT Filed: Aug. 6, 2021

(86) PCT No.: PCT/KR2021/010411
§ 371 (c)(1),
(2) Date: Feb. 6, 2023

(87) PCT Pub. No.: WO2022/031108
PCT Pub. Date: Feb. 10, 2022

(65) Prior Publication Data

US 2023/0328871 A1 Oct. 12, 2023

(30) Foreign Application Priority Data

Aug. 6, 2020 (KR) ........................ 10-2020-0098546

(51) Int. Cl.
*H05H 1/34* (2006.01)

(52) U.S. Cl.
CPC ................................ *H05H 1/3423* (2021.05)

(58) Field of Classification Search
CPC .......................... H05H 1/3423; H05H 1/4622
USPC ........................................................... 219/76
See application file for complete search history.

(56) References Cited

U.S. PATENT DOCUMENTS

2012/0217875 A1* 8/2012 Park ........................ H05H 1/46
315/111.21

FOREIGN PATENT DOCUMENTS

| | | |
|---|---|---|
| KR | 100531427 B1 * | 12/2004 |
| KR | 10-1166444 | 12/2011 |
| KR | 10-1437440 | 7/2014 |
| KR | 10-2016-0140310 | 12/2016 |
| KR | 10-1802747 | 11/2017 |
| KR | 10-2089599 | 3/2020 |
| KR | 10-2255874 | 5/2021 |

* cited by examiner

*Primary Examiner* — Steven W Crabb
*Assistant Examiner* — Dilnessa B Belay
(74) *Attorney, Agent, or Firm* — Morrison & Foerster LLP

(57) ABSTRACT

Disclosed is a plasma generation device. A plasma generation device, according to an exemplary embodiment of the present invention, comprises: an electromagnetic wave generator; a plasma torch which generates plasma by arc discharge; and a waveguide which guides an electromagnetic wave generated by the electromagnetic wave generator to be transmitted to the plasma side, wherein the electromagnetic wave transmitted through the waveguide heats one side portion of the plasma.

5 Claims, 7 Drawing Sheets

【FIG. 2】
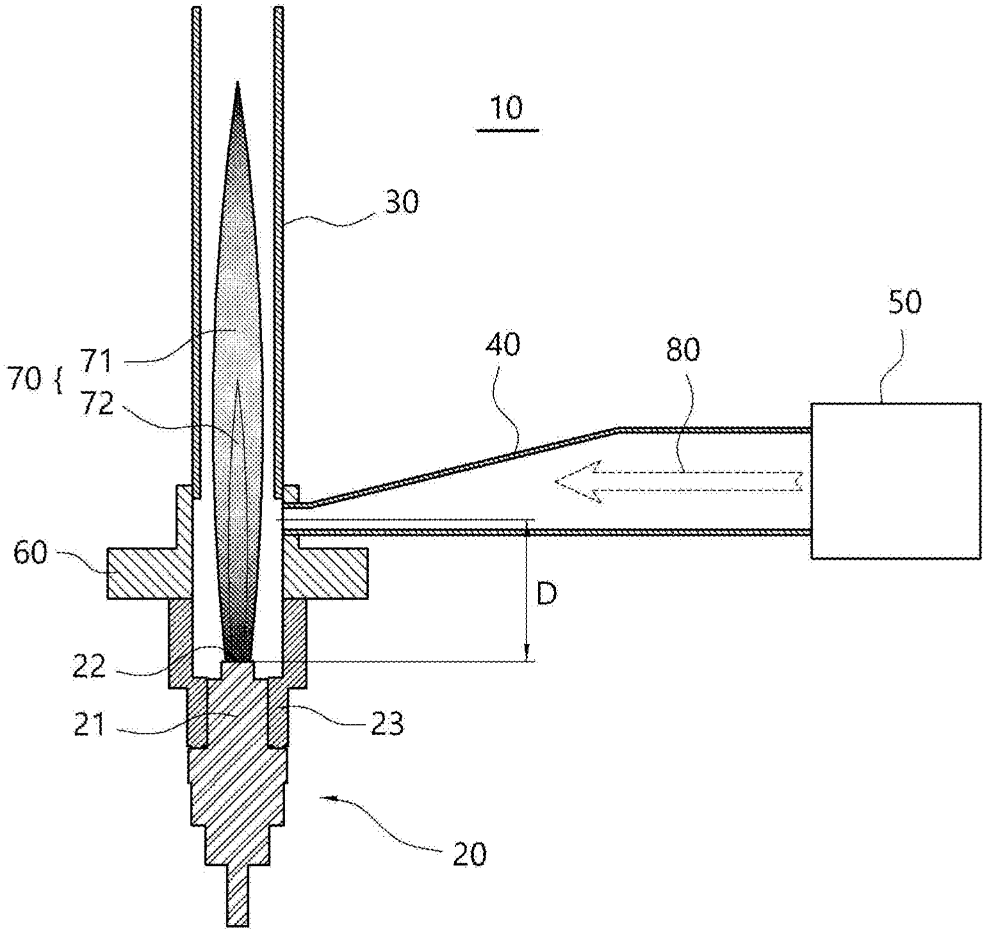

【FIG. 3】
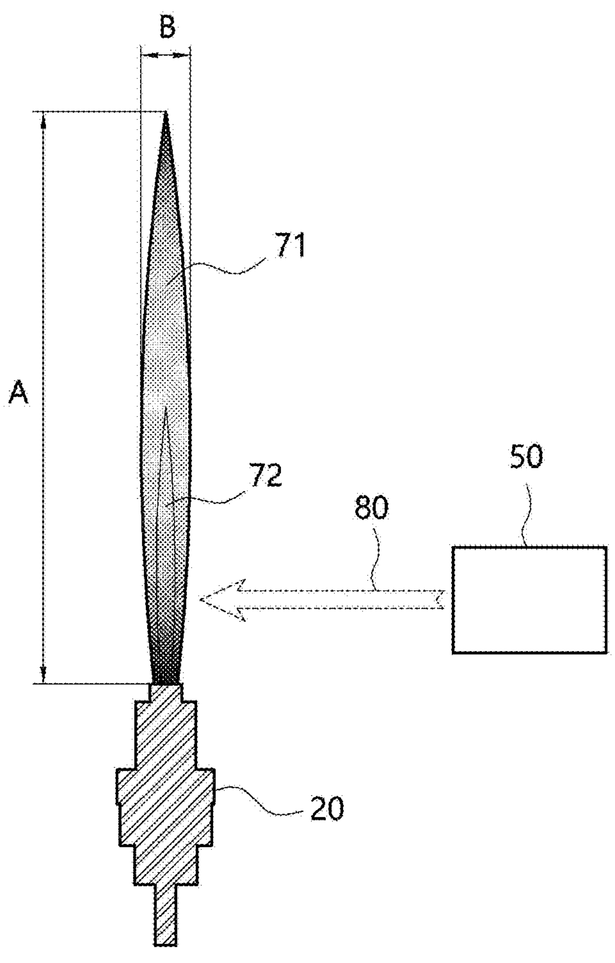

【FIG. 4】
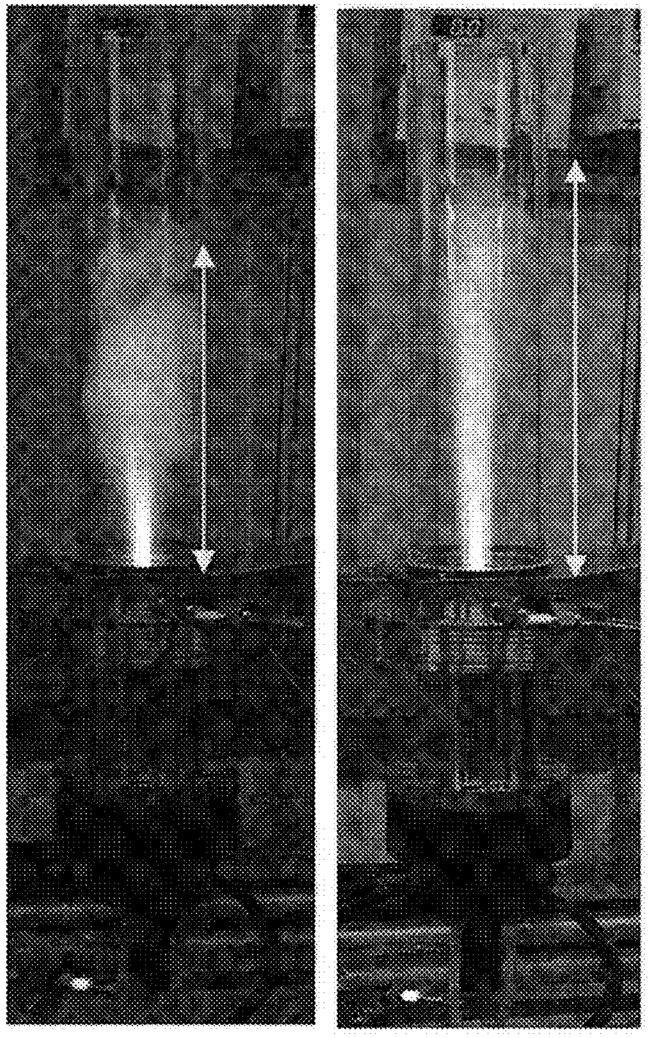
(a) (b)

【FIG. 5】
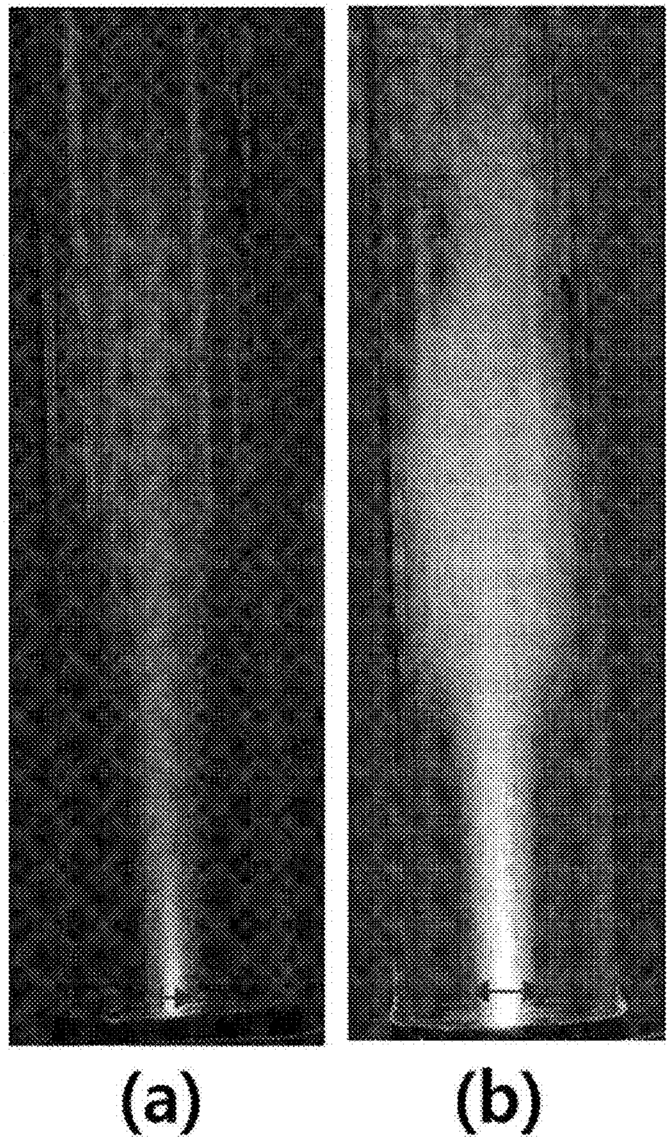

【FIG. 6】
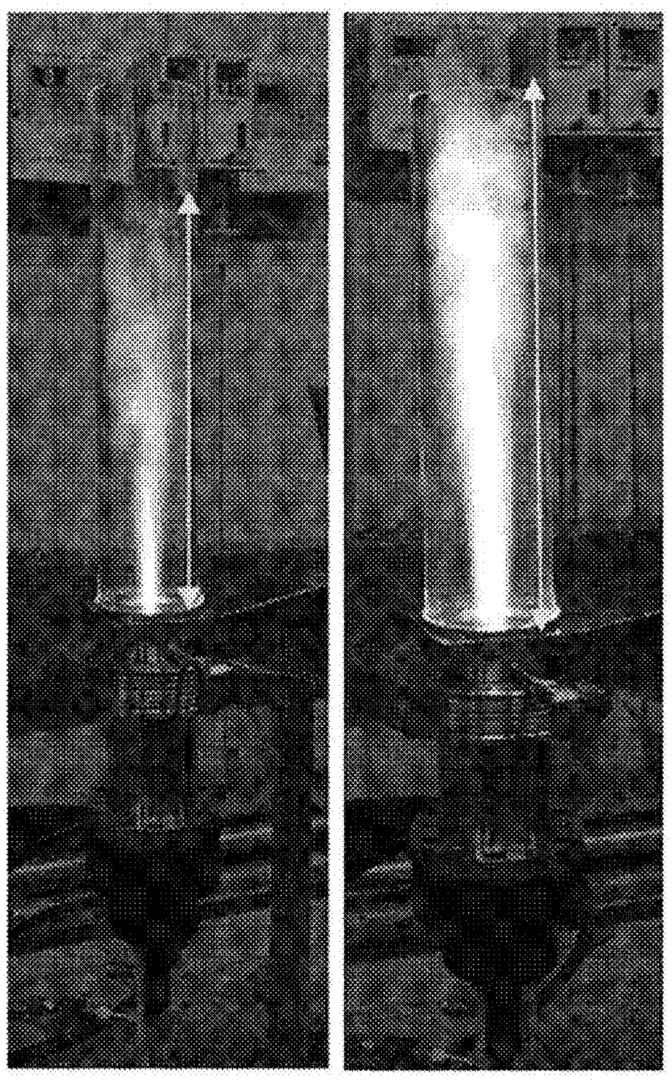
(a) (b)

【FIG. 7】
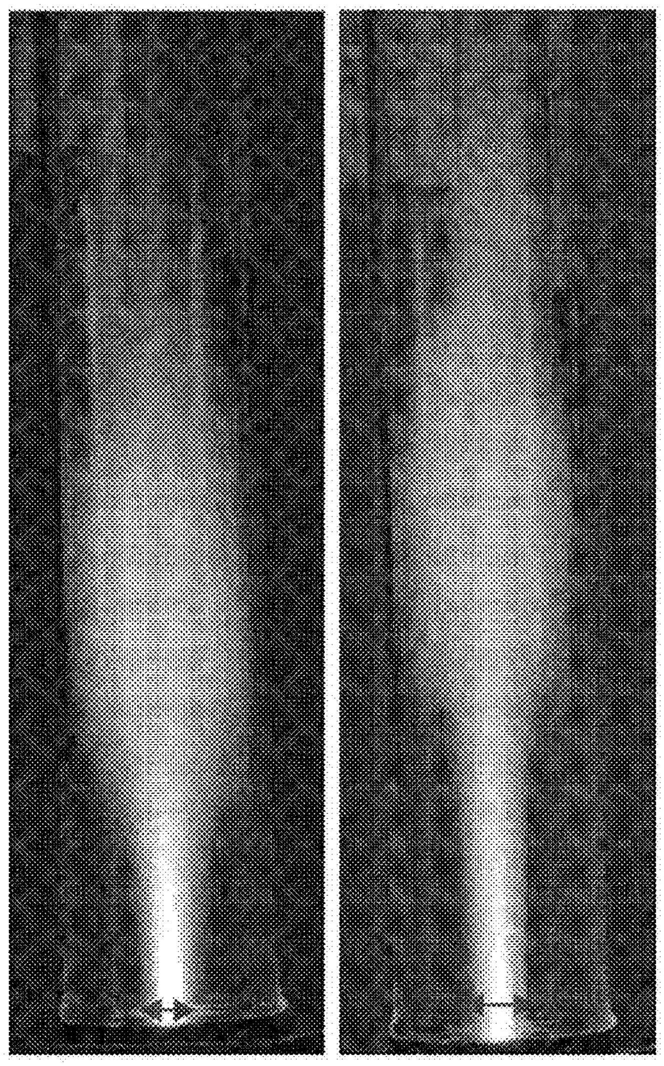
(a) (b)

PLASMA GENERATION DEVICE

CROSS REFERENCE TO RELATED APPLICATIONS

This application is a national stage application under 35 U.S.C. § 371 of International Application No. PCT/KR2021/010411, filed internationally on Aug. 6, 2021, which claims priority to and the benefit of Korean Patent Application No. 10-2020-0098546, filed on Aug. 6, 2020, the disclosures of which are incorporated herein by reference in their entireties.

TECHNICAL FIELD

The present invention relates to a plasma generation device, and more specifically to a plasma generation device which is capable of enlarging the volume of plasma generated from a plasma torch.

BACKGROUND ART

Torches that apply high heat to a specific part for the purpose of welding, cutting, surface treatment, waste combustion and the like are provided in various structures according to the type of fuel to be burned.

Recently, plasma torches that allow a higher continuous heat to be obtained by supplying a working gas (nitrogen, oxygen, hydrogen, argon, helium, methane, propane, etc.) in a plasma state created by applying a high-voltage current between two electrodes have been widely used.

Particularly, in the semiconductor manufacturing process, a high temperature of 10,000° C. or higher is required for the environmentally friendly treatment and discharge of harmful waste gases such as fluorine compounds containing PFC (PerFluoro Compound) gas and the like. In consideration of this point, research on a technique for decomposing waste gas by using an arc plasma torch which is capable of generating high-temperature plasma through arc plasma is being conducted.

However, when applied to an actual application, there is a problem in that it is difficult to secure a sufficient volume of plasma only by the plasma torch itself, which generates plasma through arc discharge, and thus, the processing efficiency of the waste gas is lowered.

DISCLOSURE

Technical Problem

An exemplary embodiment of the present invention is directed to providing a plasma generation device which is capable of sufficiently enlarging the volume of plasma generated from a plasma torch.

Technical Solution

According to an aspect of the present invention, provided is a plasma generation device, including an electromagnetic wave generator; a plasma torch which generates plasma by arc discharge; and a waveguide which guides an electromagnetic wave generated by the electromagnetic wave generator to be transmitted to the plasma side, wherein the electromagnetic wave transmitted through the waveguide heats one side portion of the plasma.

In this case, the longitudinal direction of the plasma and the direction in which the electromagnetic wave is transmitted to the plasma may be perpendicular to each other.

In this case, the electromagnetic wave may heat the plasma at a position spaced apart by a predetermined distance in the longitudinal direction of the plasma from an outlet from which the plasma is discharged.

In this case, the predetermined distance may be ¼ of the wavelength of the electromagnetic wave.

In this case, the plasma generation device may further include a connecting member for connecting the plasma torch and the waveguide to each other.

In this case, the connecting member may be formed of a flange provided with a hollow.

In this case, the waveguide may be provided with a through space to which the connecting member can be coupled to one side.

Advantageous Effects

The plasma generation device according to an exemplary embodiment of the present invention may enlarge the volume of plasma by heating one side of plasma generated from a plasma torch with electromagnetic waves.

The plasma generation device according to an exemplary embodiment of the present invention can obtain plasma with an enlarged volume while using the same power, thereby improving the efficiency of energy usage compared to the conventional plasma torch.

DESCRIPTION OF DRAWINGS

FIG. 2 is a cross-sectional view showing a cross-section of the plasma generation device according to an exemplary embodiment of the present invention.

FIG. 3 is an explanatory diagram illustrating the principle of the plasma generation device according to an exemplary embodiment of the present invention.

FIGS. 4 and 5 are photographs showing the effect of improving the volume in the longitudinal direction and the width direction of plasma generated by the plasma generation device according to an exemplary embodiment of the present invention compared to the conventional plasma torch when 5 kW power is used in the same manner.

FIGS. 6 and 7 are photographs showing the effect of improving the volume in the longitudinal direction and the width direction of plasma generated by the plasma generation device according to an exemplary embodiment of the present invention compared to the conventional plasma torch when 6 kW power is used in the same manner.

MODES OF THE INVENTION

Figure 1:
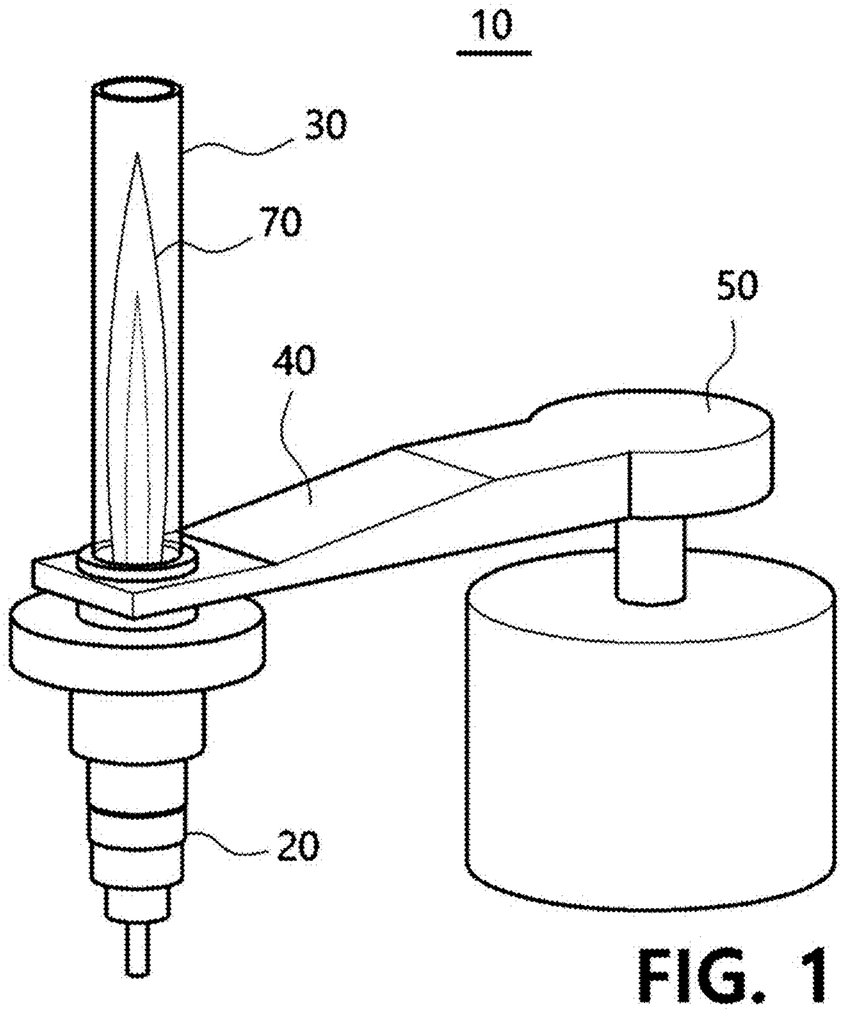
FIG. 1 is a perspective view illustrating the plasma generation device according to an exemplary embodiment of the present invention.

Hereinafter, with reference to the accompanying drawings, the exemplary embodiments of the present invention will be described in detail so that those of ordinary skill in the art to which the present invention pertains can easily practice the present invention. The present invention may be embodied in many different forms and is not limited to the exemplary embodiments described herein. In order to clearly describe the present invention in the drawings, parts that are irrelevant to the description are omitted, and the same reference numerals are assigned to the same or similar components throughout the specification.

In the present specification, terms such as "include" or "have" are intended to designate that the features, numbers, steps, operations, components, parts or combinations thereof described in the specification exist, but it should be understood that it does not preclude the possibility of the presence or addition of one or more other features, numbers, steps, operations, components, parts or combinations thereof.

In defining the direction in the present specification, when referring to FIG. 3, the longitudinal direction of plasma 70 corresponds to the vertical direction, and is defined as the direction indicated by A in FIG. 3. In addition, the width direction of the plasma 70 corresponds to the horizontal direction, and is defined as the direction indicated by B in FIG. 3.

The plasma generation device 10 according to an exemplary embodiment of the present invention is a device that generates plasma 70 by a plasma torch 20, which may enlarge the volume of the plasma 70 by using the heating by electromagnetic waves 80.

Hereinafter, with reference to the drawings, the main configuration of the plasma generation device according to an exemplary embodiment of the present invention will be described in detail.

FIG. 1 is a perspective view illustrating the plasma generation device according to an exemplary embodiment of the present invention. FIG. 2 is a cross-sectional view showing a cross-section of the plasma generation device according to an exemplary embodiment of the present invention.

The plasma generation device 10 according to an exemplary embodiment of the present invention includes a plasma torch 20 for generating atmospheric-pressure plasma.

In this case, the plasma torch 20 uses a power source such as direct current, alternating current, high frequency (RF) and the like, and generally injects a working gas for generating plasma between a negative electrode (not illustrated) and a positive electrode (not illustrated) to apply power, thereby generating arc discharge to form jet plasma.

In an exemplary embodiment of the present invention, the plasma torch 20 may be by a non-transferred method, and thus may include a torch body 21 provided with a negative electrode (not illustrated) from which electrons are emitted, and a positive electrode that also serves as a plasma outlet (nozzle, 22) from which the plasma 70 is discharged.

In this case, the positive electrode serving as the plasma outlet 22 may be connected to a working gas supply pipe (not illustrated) to which the working gas is supplied, and a known gas such as helium, argon, nitrogen and the like may be used as the working gas.

In addition, one side of the torch body 21 guides the plasma 70 discharged from the plasma outlet 22 in one direction, and the guide member 23 may be coupled to a connection member 60 to be described below.

In this case, the guide member 23 has a hollow formed therein so as to guide the plasma 70 as illustrated in FIG. 2, and one end may be coupled to the plasma torch 20 and the other end may be coupled to the connecting member 60. That is, the guide member 23 may function as a medium for coupling between the plasma torch 20 and the connecting member 60.

In this case, a plurality of guide members 23 each having different extension lengths may be provided as needed. Through this, the plasma generation device 10 according to an exemplary embodiment of the present invention selects and interposes a guide member 23 having an appropriate standard as necessary, and thus, it is possible to change a separation distance (D) between the plasma torch 20 and the connection member 60.

The reason why the separation distance (D) needs to be changed is because the separation distance (D) is determined in consideration of the wavelength of the electromagnetic wave 80 transmitted through the waveguide 40 for more effective plasma discharge. This will be described below.

However, such a guide member 23 is not necessarily required, and may be omitted if necessary. That is, the plasma torch 20 and the connecting member 60 may be directly connected without the guide member 23.

The plasma generation device 10 according to an exemplary embodiment of the present invention includes an electromagnetic wave generator 50 for generating an electromagnetic wave 80 to be transmitted toward the plasma 70 generated by the plasma torch 20.

In this case, as the electromagnetic wave generator 50, for example, a magnetron that oscillates electromagnetic waves in a band of 10 MHz to 10 GHz may be used, and since a commonly used magnetron may be used, the detailed description thereof will be omitted.

In this case, referring to FIGS. 1 and 2, the electromagnetic wave generator 50 may be positioned to be spaced apart from the plasma torch 20 in the width direction of the plasma. Therefore, in order to transmit the electromagnetic wave 80 oscillated by the electromagnetic wave generator 50 toward the plasma 70, a separate transmission means is required.

To this end, the plasma generation device 10 according to an exemplary embodiment of the present invention includes a waveguide 40 as a path through which the electromagnetic wave 80 oscillated by the electromagnetic wave generator 50 is transmitted toward the plasma 70.

More specifically, referring to FIG. 2, the waveguide 40 is formed to extend in the width direction of the plasma 70, and the electromagnetic wave 80 is disposed to heat one side portion of the plasma 70. Herein, the electromagnetic wave 80 heating the plasma 70 means that the electromagnetic wave 70 is directly supplied to the outer side 71 of the plasma 70.

In an exemplary embodiment of the present invention, as illustrated in the drawings, the longitudinal direction of the plasma 70 and the extension direction of the waveguide 40 (or the direction in which electromagnetic waves are transmitted toward the plasma 70) may be perpendicular to each other.

In addition, the waveguide 40 has a predetermined width and height, and in this case, the wavelength of the electromagnetic wave 80 may be determined according to standards such as the length and width of the waveguide 40. Accordingly, the waveguide 40 of various standards may be used according to the wavelength of the electromagnetic wave 80 required for design.

Further, in the drawings, the height of the waveguide decreases as it approaches toward the plasma 70 and is shown in an inclined form, but the shape of the waveguide 40 of the plasma generation device 10 according to an exemplary embodiment of the present invention is not necessarily limited thereto.

Meanwhile, one side of the waveguide 40 must communicate with the plasma torch 20 such that the electromagnetic wave 80 may heat the side portion of the plasma 70. To this end, the plasma generation device 10 according to an exemplary embodiment of the present invention may introduce a separate connecting member 60.

For example, referring back to FIG. 2, the connecting member 60 may be formed of a flange having a hollow shape such that the plasma 70 may pass therein. In this case, one side of the connection member 60 may be directly coupled to the plasma torch 20, or may be coupled to the plasma torch 20 through the guide member 23 described above.

In addition, a cylindrical discharge tube 30 extending in the longitudinal direction of the plasma 70 while enclosing the outer peripheral region of the plasma 70 may be coupled to the opposite side with respect to the connection member 60. Herein, the discharge tube 30 may be made of, for example, quartz, through which the plasma 70 may be visually observed, or a space for reacting a processing gas such as waste gas and the like with the plasma 70 may be formed.

In addition, the waveguide 40 may be connected to the lateral direction of the connection member 60. To this end, a slit-type space to which the waveguide 40 may be coupled is formed in the lateral direction of the connection member 60, or a through space may be formed such that the connection member 60 may be coupled to the waveguide 40 itself, and accordingly, the connecting member 60 may be inserted and coupled in the longitudinal direction (A) of the plasma. As such, when the plasma torch 20 and the waveguide 40 are coupled to each other, an airtight member such as a packing and the like may be used to maintain airtightness in the coupling portion.

In an exemplary embodiment of the present invention, the waveguide 40 may be positioned to be spaced apart from the plasma outlet 22 of the plasma torch 20 by a predetermined distance in the longitudinal direction of the plasma 70. This is because the plasma generation device 10 according to an exemplary embodiment of the present invention may enlarge the volume of the plasma 70 by heating the side portion of the plasma 70 after the plasma 70 is formed in the form of a visible flame, and to this end, it is necessary to be spaced apart from the plasma outlet 22 in the longitudinal direction of the plasma.

In this case, the distance (D) at which the waveguide 40 is spaced apart from the plasma outlet 22 of the plasma torch 20 in the longitudinal direction of the plasma 70 may be determined in consideration of the wavelength of the electromagnetic wave 80 which is transmitted through the waveguide 40 as described above.

Specifically, the distance (D) at which the waveguide 40 is spaced apart from the plasma outlet 22 is preferably about ¼ of the wavelength of the electromagnetic wave 80. This is for more effectively enlarging the volume of the plasma 70.

Therefore, the distance (D) at which the waveguide 40 is spaced apart from the plasma outlet 22 may vary according to the standard of the waveguide 40 that may determine the wavelength of the electromagnetic wave 80.

Hereinafter, the operation and effect of the plasma generation device according to an exemplary embodiment of the present invention will be described in more detail with reference to the drawings.

FIG. 3 is an explanatory diagram illustrating the principle of the plasma generation device according to an exemplary embodiment of the present invention. FIGS. 4 and 5 are photographs showing the effect of improving the volume in the longitudinal direction and the width direction of plasma generated by the plasma generation device according to an exemplary embodiment of the present invention compared to the conventional plasma torch when 5 kW power is used in the same manner. FIGS. 6 and 7 are photographs showing the effect of improving the volume in the longitudinal direction and the width direction of plasma generated by the plasma generation device according to an exemplary embodiment of the present invention compared to the conventional plasma torch when 6 kW power is used in the same manner.

Referring to FIG. 3, the plasma generation device 10 according to an exemplary embodiment of the present invention may improve the volume of the plasma 70 by directly heating by supplying an electromagnetic wave 80 to one side portion of the atmospheric pressure plasma 70 which is primarily formed by using the plasma torch 20.

Herein, the volume of the plasma 70 means a volume in the longitudinal direction (A) or the width direction (B) of the plasma 70. In particular, according to the plasma generation device according to an exemplary embodiment of the present invention, the high-temperature region 72 at the center of the plasma 70 is diffused into the outer region 71 of the relatively low-temperature plasma such that the entire volume and temperature of the plasma 70 may be enlarged.

By enlarging the volume of the plasma 70 in this way, for example, it is possible to increase the reaction time between the plasma 70 and the processing gas such as waste gas and the like produced by the semiconductor process.

Meanwhile, the plasma generation device 10 according to an exemplary embodiment of the present invention has an effect of improving energy efficiency. In order to verify this effect, while using the same power, the inventors of the present invention observed the plasma volumes of (a) a case of generating plasma by using only a plasma device by the existing arc discharge, and (b) a case of heating one side of the plasma 70 with an electromagnetic wave as in the plasma generation device according to an exemplary embodiment of the present invention, and compared the same. The comparison results associated therewith are summarized in the table below.

TABLE 1

| Total power used | Power distribution method (kW) | Longitudinal volume (cm) | Volume increase rate (%) |
|---|---|---|---|
| 5.0 kW | Torch 5.0 kW | 2.42 | — |
| | Torch 4.0 kW + Electromagnetic wave heating 1.0 kW | 3.35 | 138 |
| 6.0 kW | Torch 6.0 kW | 2.62 | — |
| | Torch 5.0 kW + Electromagnetic wave heating 1.0 kW | 3.85 | 147 |
| | Torch 4.5 kW + Electromagnetic wave heating 1.5 kW | 3.31 | 126 |
| 7.0 kW | Torch 7.0 kW | 3.96 | — |
| | Torch 5.5 kW + Electromagnetic wave heating 1.5 kW | 4.86 | 123 |
| 7.5 kW | Torch 7.5 kW | 2.82 | — |
| | Torch 6.0 kW + Electromagnetic wave heating 1.5 kW | 5.08 | 180 |

(Herein, the torch means the power supplied to the plasma torch, and the longitudinal volume means the volume on the image in which the plasma is photographed)

As can be confirmed in Table 1 and FIG. 4, in spite of using the same power of 5 kW, when heating of the electromagnetic wave 80 was performed in parallel by distributing power to the plasma torch 20 and the electromagnetic wave generator 50 compared to when using only the plasma torch 20, it can be confirmed that the longitudinal volume was enlarged by 138%. Referring to FIG. 5, as can be seen from the fact that the volume of the plasma 70 was enlarged by 600% or more in the width direction, it is confirmed that the effect of enlarging the plasma 70 was more pronounced. In addition, it can be seen that the high-temperature region of the plasma indicated in white in FIGS. 4 and 5 was also clearly enlarged.

Referring back to Table 1, it can be seen that the effect of enlarging the plasma volume through electromagnetic heating occurs similarly even when the total power used was increased to 6 kW, 7 kW or 7.5 kW. Certainly, this plasma volume enlarging effect is also supported through FIGS. 6 and 7 which were photographed by setting the total power used as 6 kW. Likewise, it can be seen that the plasma high-temperature region was also remarkably enlarged.

Based on the above-described experimental results, when the plasma generation device 10 according to an exemplary embodiment of the present invention is applied, the plasma volume may be significantly enlarged while using the same electric power, thereby obtaining a remarkable effect in terms of energy efficiency.

As described above, the plasma generation device 10 according to an exemplary embodiment of the present invention may enlarge the volume of plasma by heating one side portion of the plasma generated from the plasma torch through electromagnetic waves.

In addition, since the plasma generation device according to an exemplary embodiment of the present invention may obtain plasma with an enlarged volume while using the same power, it is possible to improve the efficiency of energy usage.

Although an exemplary embodiment of the present invention has been described above, the spirit of the present invention is not limited to the exemplary embodiment presented herein, and those skilled in the art who understand the spirit of the present invention will be able to easily suggest other exemplary embodiments by modifying, changing, deleting or adding components within the scope of the same spirit, but this is also said to be within the scope of the present invention.

The invention claimed is:

1. A plasma generation device, comprising:

an electromagnetic wave generator;

a plasma torch which generates plasma by arc discharge; and a waveguide which guides an electromagnetic wave generated by the electromagnetic wave generator to be transmitted to a plasma, wherein the electromagnetic wave transmitted through the waveguide heats one side portion of the plasma, wherein the electromagnetic wave heats the plasma at a position spaced apart by a predetermined distance in the longitudinal direction of the plasma from an outlet from which the plasma is discharged, and wherein the predetermined distance is ¼ of the wavelength of the electromagnetic wave.

2. The plasma generation device of claim 1, wherein the longitudinal direction of the plasma and the direction in which the electromagnetic wave is transmitted to the plasma are perpendicular to each other.

3. The plasma generation device of claim 1, further comprising:

a connecting member for connecting the plasma torch and the waveguide to each other.

4. The plasma generation device of claim 3, wherein the connecting member is formed of a flange provided with a hole.

5. The plasma generation device of claim 3, wherein the waveguide is provided with a through space to which the connecting member can be coupled to one side.

* * * * *